(12) United States Patent
Gonikberg et al.

(10) Patent No.: US 8,639,261 B2
(45) Date of Patent: *Jan. 28, 2014

(54) SELECTING RECEIVER PARAMETERS BASED UPON TRANSMITTING DEVICE IDENTIFICATION VIA TRANSMISSION CHARACTERISTICS

(75) Inventors: Mark Gonikberg, Los Altos Hills, CA (US); Marcellus Forbes, San Francisco, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/563,572

(22) Filed: Jul. 31, 2012

(65) Prior Publication Data

US 2012/0294180 A1 Nov. 22, 2012

Related U.S. Application Data

(63) Continuation of application No. 11/796,166, filed on Apr. 27, 2007, now Pat. No. 8,238,933.

(51) Int. Cl.
*H04W 72/00* (2009.01)
*H04W 24/00* (2009.01)
*H04B 7/00* (2006.01)
*H04M 1/00* (2006.01)
*H04B 1/38* (2006.01)
*H04J 1/16* (2006.01)
*H04W 4/00* (2009.01)

(52) U.S. Cl.
USPC .......... 455/452.1; 455/456.1; 455/455; 455/457; 455/516; 455/550; 455/562.1; 455/509; 455/574; 370/252; 370/329; 370/338

(58) Field of Classification Search
USPC ............ 455/456.1, 457, 550.1, 562.1, 575.7, 455/452.1, 455, 509, 574; 370/252, 329, 370/338
See application file for complete search history.

(56) References Cited

U.S. PATENT DOCUMENTS

| | | | |
|---|---|---|---|
| 6,034,971 A * | 3/2000 | Love et al. ................... 370/468 |
| 8,238,933 B2 * | 8/2012 | Gonikberg et al. ........ 455/456.1 |
| 2003/0210276 A1 * | 11/2003 | Patitucci ..................... 345/810 |
| 2007/0025265 A1 * | 2/2007 | Porras et al. .................. 370/252 |
| 2007/0037518 A1 * | 2/2007 | Ninomiya et al. ........... 455/41.2 |
| 2007/0253341 A1 * | 11/2007 | Atkinson et al. .............. 370/252 |
| 2008/0039012 A1 * | 2/2008 | McKay et al. ............... 455/11.1 |
| 2008/0174553 A1 * | 7/2008 | Trust ............................ 345/163 |
| 2012/0069762 A1 * | 3/2012 | Thermond et al. ........... 370/252 |

* cited by examiner

*Primary Examiner* — Inder Mehra
(74) *Attorney, Agent, or Firm* — Garlick & Markison

(57) ABSTRACT

A wireless device includes at least one antenna, an RF interface, and processing circuitry coupled to the RF interface and indirectly to the at least one antenna. The wireless device identifies other wireless devices that service based upon transmission characteristics of wireless signals received from other wireless devices and/or relative positions of the other wireless devices with respect to itself. In a first operational period, the wireless device determines transmission characteristics of the other wireless devices. Then, during a second operational period, without further interaction with the other wireless devices, the wireless device determines communication link characteristics based simply upon transmission characteristics of the other wireless devices.

20 Claims, 6 Drawing Sheets

SELECTING RECEIVER PARAMETERS BASED UPON TRANSMITTING DEVICE IDENTIFICATION VIA TRANSMISSION CHARACTERISTICS

CROSS REFERENCE TO RELATED APPLICATION

The present U.S. utility patent application claims priority under 35 U.S.C. §120, as a continuation of U.S. utility patent application having an application Ser. No. 11/796,166, filed Apr. 27, 2007, now U.S. Pat. No. 8,238,933, which is incorporated herein by reference in its entirety for all purposes.

BACKGROUND

1. Technical Field

The present invention relates generally to wireless communication systems; and more particularly to the servicing of communications by a wireless device.

2. Related Art

Communication systems are well known. Communication systems include both wired communication systems and wireless communication systems. Wired communication systems include the Public Switched Telephone Network (PSTN), Wide Area Networks (WANs), Local Area Networks (LANs), and other networks that use wired or optical media for the transmission of data. Wireless communication systems include cellular telephone systems, satellite communication systems, Wireless Local Area Networks (WLANs), e.g., IEEE 802.11x networks, Wireless Wide Area Networks (WWANs), e.g., WiMAX networks, Wireless Personal Area Networks (WPANs), e.g., Bluetooth and IEEE 802.15 networks, and other networks that employ a wireless link between serviced wireless devices. Of course, many communications are serviced using a combination of wireless communication systems and wired communication systems.

The network infrastructure of WWANs and WLANs include backhaul networks and a plurality of Access Points (APs). Each AP supports wireless communications within a respective service area. A WWAN AP services wireless terminals within a relatively large radius, e.g., one or more miles. WLAN APs service wireless terminals within a much smaller radius, e.g., one hundred yards or less. A WLAN, supported by one ore more WLAN APs, may service a premises such as an office complex, a coffee shop, an airport lounge, a home, etc. Wireless terminals may roam within a WLAN service area and/or from WLAN service area to WLAN service area. A WWAN service area may extend for miles and is contemplated to service lower density subscriber areas within rural areas, for example. WPANs typically service communications between wireless devices at a maximum distance of 10 meters. WPAN wireless terminals typically have the ability to establish WPAN communications with any proximate servicing host/peer device.

Typically, a WLAN AP or WWAN AP point supports a number of wireless terminals, each at differing locations within its servicing area. The location of each wireless terminal with respect to the AP may be fixed. Thus, each time that the AP services a particular wireless terminal, a same communication protocol is used and the wireless terminal resides in the same relative position with respect to the AP. Further, based upon similar operations of the wireless terminal from time period to time period, the AP may use similar gain settings, imbalance compensation, and other operations. However, the AP must determine and re-determine these communication characteristics each time that the AP services communications with the wireless device. Determining and enacting these communication characteristics during each servicing consumes processing resources of the AP and also consumes allocated spectrum without any data carrying. Thus, a need exists to reduce or eliminate these wasted processing and spectrum allocation uses.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
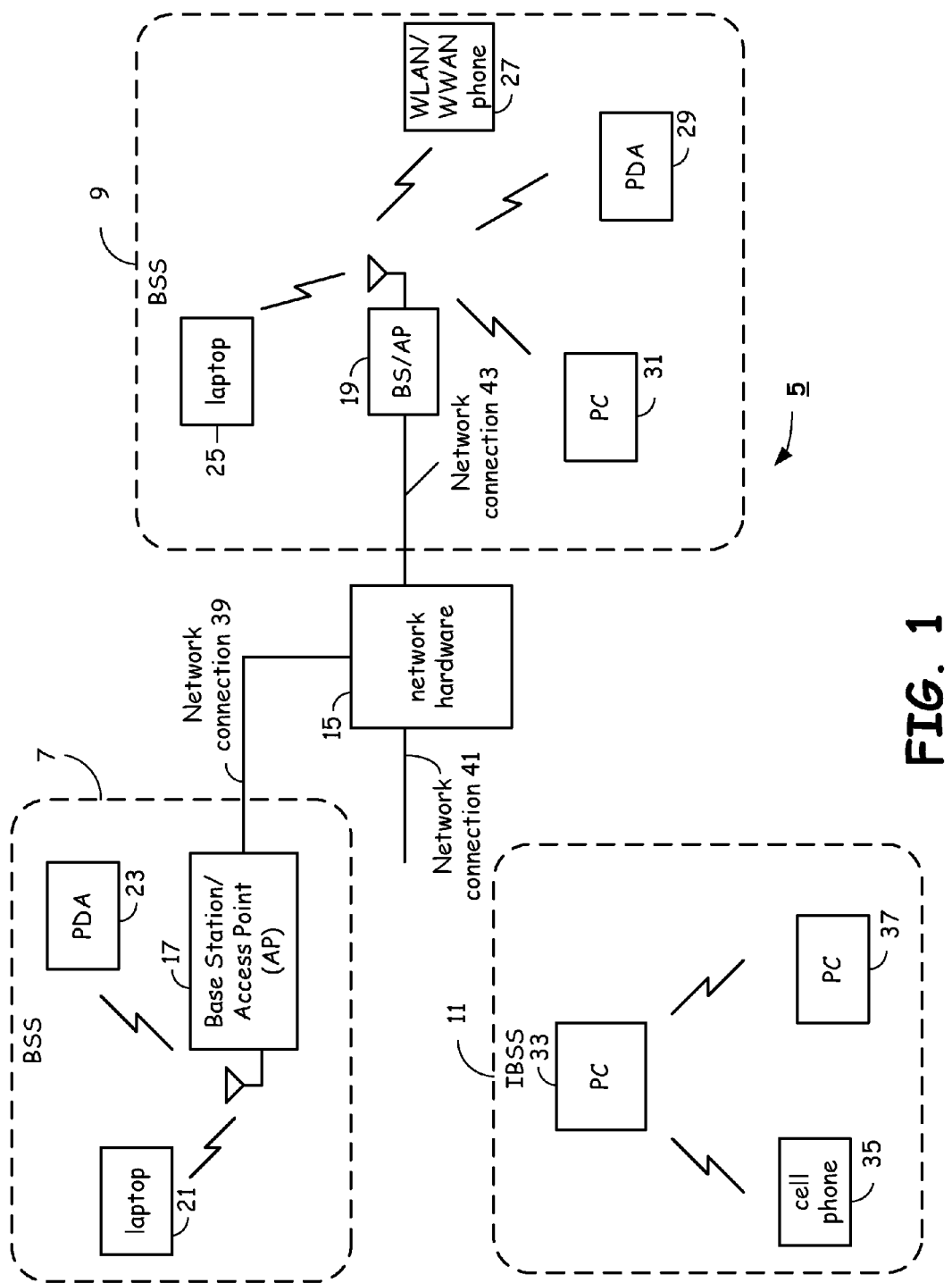
FIG. 1 is a system diagram illustrating a portion of a cellular wireless communication system that supports wireless devices operating according to embodiments of the present invention.

FIG. 1 is a system diagram illustrating a portion of a cellular wireless communication system that supports wireless devices operating according to embodiments of the present invention. The principles of the present invention are applicable to any system that supports data networking. Thus the structure of FIG. 1 will be described herein for cellular communication systems, Wireless Local Area Networks (WLANs), Wireless Wide Area Networks (WWANs), and Wireless Personal Area Networks (WPANs). However, the principles of the present invention apply to other types of wireless systems as well.

Each of a plurality of service areas (cells/sectors/coverage areas) 7 and 9 is serviced by a base station and/or Access Point (AP) 17, 19 that supports wireless communications with a plurality of wireless devices 21-23, 25-31. In supporting cellular communications, each of the base stations 17 and 19 supports one or more cellular standards that may include the Global System for Mobile telecommunications (GSM) standards, the North American Code Division Multiple Access (CDMA) standards, the North American Time Division Multiple Access (TDMA) standards, the $3^{rd}$ Generation Partnership Project (3GPP) standards, the 1xRTT standards, the 1xEV-DO standards, the 1xEV-DV standards, and the Universal Mobile Telecommunications Services (UMTS)/Wideband CDMA (WCDMA) standards, among others. These supported standards may further include the High Speed Data Packet Access (HSDPA) standards, the High Speed Uplink Packet Access standards, the 1xEV-DO standards, and the 1xEV-DV standards, for example, that specifically support high rate data communications.

In supporting other types of wireless systems, e.g., WLAN systems, WWAN systems, access points 7 and 9 support a WLAN standard such as one or more of the IEEE 802.11x standards, a WWAN standard such as WiMAX standard, or another wireless interface standard that supports high rate data transfers. Typically, base stations are used for cellular telephone systems and like-type systems, while APs are used for in-home or in-building wireless networks. Regardless of the particular type of communication system, each base station/access point 7 and 9 and wireless device 21-23 and 25-31 includes a built-in radio transceiver and/or is coupled to a radio transceiver to facilitate direct and/or in-direct wireless communications within the communication system 5. An IBSS 11 services a plurality of wireless devices 33-37 and operates according to a WLAN standard such as one or more of the IEEE 802.11s standards, a WPAN standard such as the Bluetooth standards or the IEEE 802.15 standards, or other wireless interface standards that support direct communication between wireless devices without an infrastructure base station/access point. Each of the wireless devices 21-37 may be laptop host computers 21 and 25, personal digital assistant hosts 23 and 29, personal computer hosts 31 and 33, and/or cellular telephone hosts 27 and 35.

The base stations/access points 17 and 19 are operably coupled to network hardware 15 via network connections 39 and 43. The network hardware 15, which may be a Base Station Controller (BSC), a Mobile Switching Station (MSC), a Radio Network Controller (RNC), router, switch, bridge, modem, system controller, et cetera, provides a network connection 41 for the communication system 5. Each of the base stations or access points 17, 19 has an associated antenna or antenna array to communicate with the wireless devices in its area. Typically, the wireless devices register with a particular base station or access point 17, 19 to receive services from the communication system 5. For direct connections (i.e., point-to-point communications) within IBSS 11, wireless devices 33-37 communicate directly via an allocated channel.

The principles of the present invention apply to each of the wireless devices 21-23, 25-29, and 33-37 as well as to each of the base stations/access points 17 and 19. Generally, a wireless device operating according to the present invention, e.g., AP 17, uniquely or semi-uniquely identifies each other wireless device with which it communicates by the transmit characteristics of the other wireless devices. These transmit characteristics are determined based upon wireless signals received from the other wireless devices. The transmission characteristics may be determined from the preamble of the wireless signal, from multiple copies of the wireless signal received via multiple antennas, or other characteristics of the wireless signal. The transmit characteristic may be characteristics of the received wireless signal, relative positions of the other wireless devices, or other characteristics that allows the wireless device to uniquely (or semi-uniquely) identify each other of the wireless devices.

After identifying the other wireless device via respective transmission characteristics, e.g. PDA 23, via its transmission characteristics, the AP 17 determines communication link characteristics for the other wireless device 23 via interaction with the other wireless device 23. The next time that the other wireless device 23 transmits to the wireless device, AP 17, requesting service from the AP 17, the AP 17 identifies the other wireless device 23 via its transmission characteristics determined during the later interaction. Based upon this identification of the other wireless device 23 via the transmission characteristics, the AP 17 simply retrieves the corresponding communication link characteristics and applies them. Thus, the AP 17 does not need to again determine the communication link characteristics it will employ with the other wireless device but simply retrieves and enacts them. The principles of the present invention will be described further with reference to particular embodiments of FIGS. 2-6.

Figure 2:
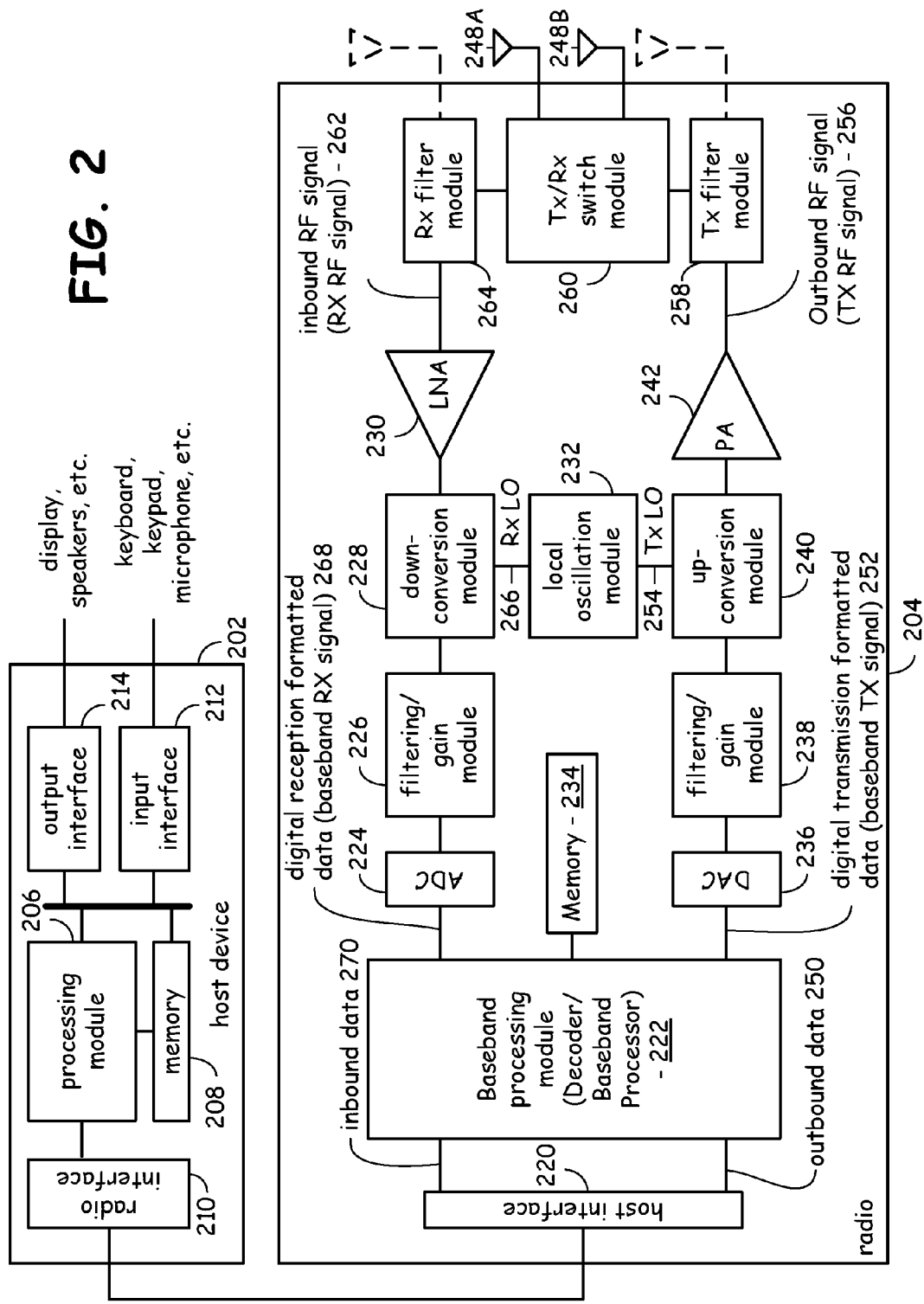
FIG. 2 is a block diagram functionally illustrating a wireless device constructed according to an embodiment of the present invention.

FIG. 2 is a block diagram functionally illustrating a wireless device constructed according to an embodiment of the present invention. The wireless device may be one of the wireless devices of FIG. 1 or one of the base station/APs of FIG. 1. The wireless device includes host processing components 202 and an associated radio 204. For cellular telephones, for WLAN phones, for WWAN phones, and for other particular devices, the host processing components and the radio 204 are typically contained within a single housing. In some cellular telephones, the host processing components 202 and some or all of the components of the radio 204 are formed on a single Integrated Circuit (IC). For personal digital assistants hosts, laptop hosts, and/or personal computer hosts, the radio 204 may reside within an expansion card or upon a mother board and, therefore, be housed separately from the host processing components 202. The host processing components 202 include at least a processing module 206, memory 208, radio interface 210, an input interface 212, and an output interface 214. The processing module 206 and memory 208 execute instructions to support host terminal functions. For example, for a cellular telephone host device, the processing module 206 performs user interface operations and executes host software programs among other operations.

The radio interface 210 allows data to be received from and sent to the radio 204. For data received from the radio 204 (e.g., inbound data), the radio interface 210 provides the data to the processing module 206 for further processing and/or routing to the output interface 214. The output interface 214 provides connectivity to an output display device such as a display, monitor, speakers, et cetera such that the received data may be displayed. The radio interface 210 also provides data from the processing module 206 to the radio 204. The processing module 206 may receive the outbound data from an input device such as a keyboard, keypad, microphone, et cetera via the input interface 212 or generate the data itself. For data received via the input interface 212, the processing module 206 may perform a corresponding host function on the data and/or route it to the radio 204 via the radio interface 210.

Radio 204 includes a host interface 220, baseband processing module 222 (baseband processor) 222, analog-to-digital converter 224, filtering/gain module 226, down conversion module 228, low noise amplifier 230, local oscillation module 232, memory 234, digital-to-analog converter 236, filtering/gain module 238, up-conversion module 240, power amplifier 242, RX filter module 264, TX filter module 258, TX/RX switch module 260, and antenna 248. Antenna 248 may be a single antenna that is shared by transmit and receive paths (half-duplex) or may include separate antennas for the transmit path and receive path (full-duplex). The antenna implementation will depend on the particular standard to which the wireless communication device is compliant.

The baseband processing module 222 includes one or more processing devices, some of which may be dedicated hardware components and some of which may be digital processors that execute operational instructions such as software instructions or firmware instructions. The baseband processing module 222 in combination with operational instructions stored in memory 234, execute digital receiver functions and digital transmitter functions. The digital receiver functions include, but are not limited to, digital intermediate frequency to baseband conversion, demodulation, constellation demapping, descrambling, and/or decoding. The digital transmitter functions include, but are not limited to, encoding, scrambling, constellation mapping, modulation, and/or digital baseband to IF conversion. Transmit and receive functions provided by the baseband processing module 222 may be implemented using shared processing devices and/or individual processing devices.

Processing devices, such as the baseband processing module 222, may include microprocessors, micro-controllers, digital signal processors, microcomputers, central processing units, field programmable gate arrays, programmable logic devices, state machines, logic circuitry, analog circuitry, digital circuitry, and/or any device that manipulates signals (analog and/or digital) based on operational instructions. The memory 234 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 222 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 204 receives outbound data 250 from the host processing components via the host interface 220. The host interface 220 routes the outbound data 250 to the baseband processing module 222, which processes the outbound data 250 in accordance with a particular wireless communication standard (e.g., UMTS/WCDMA, GSM, GPRS, EDGE, HSDPA, HSUPA, 802.11x, WiMAX, 802.15, Bluetooth, et cetera) to produce digital transmission formatted data 252. The digital transmission formatted data 252 is a digital baseband signal or a digital low IF signal, where the low IF will be in the frequency range of zero to a few kilohertz/megahertz.

The digital-to-analog converter 236 converts the digital transmission formatted data 252 from the digital domain to the analog domain. The filtering/gain module 238 filters and/or adjusts the gain of the analog signal prior to providing it to the up-conversion module 240. The up-conversion module 240 directly or in a multi-step process converts the analog baseband or low IF signal into an RF signal based on a transmitter local oscillation 254 provided by local oscillation module 232. The power amplifier 242 amplifies the RF signal to produce outbound RF signal 256, which is filtered by the TX filter module 258. The TX/RX switch module 260 receives the amplified and filtered RF signal from the TX filter module 258 and provides the output RF signal 256 signal to the antennas 248A and/or 248B, which transmits the outbound RF signal 256 to a targeted device such as a base station 103-106.

The radio 204 also receives an inbound RF signal 262, which was transmitted by a base station via the antennas 248A and/or 248B, the TX/RX switch module 260, and the RX filter module 264. The low noise amplifier 230 receives inbound RF signal 262 and amplifies the inbound RF signal 262 to produce an amplified inbound RF signal. The low noise amplifier 230 provides the amplified inbound RF signal to the down conversion module 228, which converts the amplified inbound RF signal into an inbound low IF signal or baseband signal based on a receiver local oscillation 266 provided by local oscillation module 232. The down conversion module 228 provides the inbound low IF signal (or baseband signal) to the filtering/gain module 226, which filters and/or adjusts the gain of the signal before providing it to the analog to digital converter 224.

The analog-to-digital converter 224 converts the filtered inbound low IF signal (or baseband signal) from the analog domain to the digital domain to produce digital reception formatted data 268. The baseband processing module 222 demodulates, demaps, descrambles, and/or decodes the digital reception formatted data 268 to recapture inbound data 270 in accordance with the particular wireless communication standard being implemented by radio 204. The host interface 220 provides the recaptured inbound data 270 to the host processing components 202 via the radio interface 210.

As the reader will appreciate, all components of the radio 204, including the baseband processing module 222 and the RF front end components may be formed on a single integrated circuit. In another construct, the baseband processing module 222 and the RF front end components of the radio 204 may be formed on separate integrated circuits. The radio 204 may be formed on a single integrated circuit along with the host processing components 202. In still other embodiments, the baseband processing module 222 and the host processing components 202 may be formed on separate integrated circuits. Thus, all components of FIG. 2 excluding the antenna, display, speakers, et cetera and keyboard, keypad, microphone, et cetera may be formed on a single integrated circuit. Many differing constructs integrated circuit constructs are possible without departing from the teachings of the present invention.

The TX/RX switch module 260 services both antennas 248A and 248B. Along with the servicing provided by other components of the radio 204, the TX/RX switch module 260 supports directional antenna gain operations using the multiple antennas 248A and 248B. Thus, the radio 204 is able to modify the antenna gain pattern based upon desired operations according to some aspects to the present invention. These operations will be further described with reference to FIGS. 5 and 6.

Figure 3:
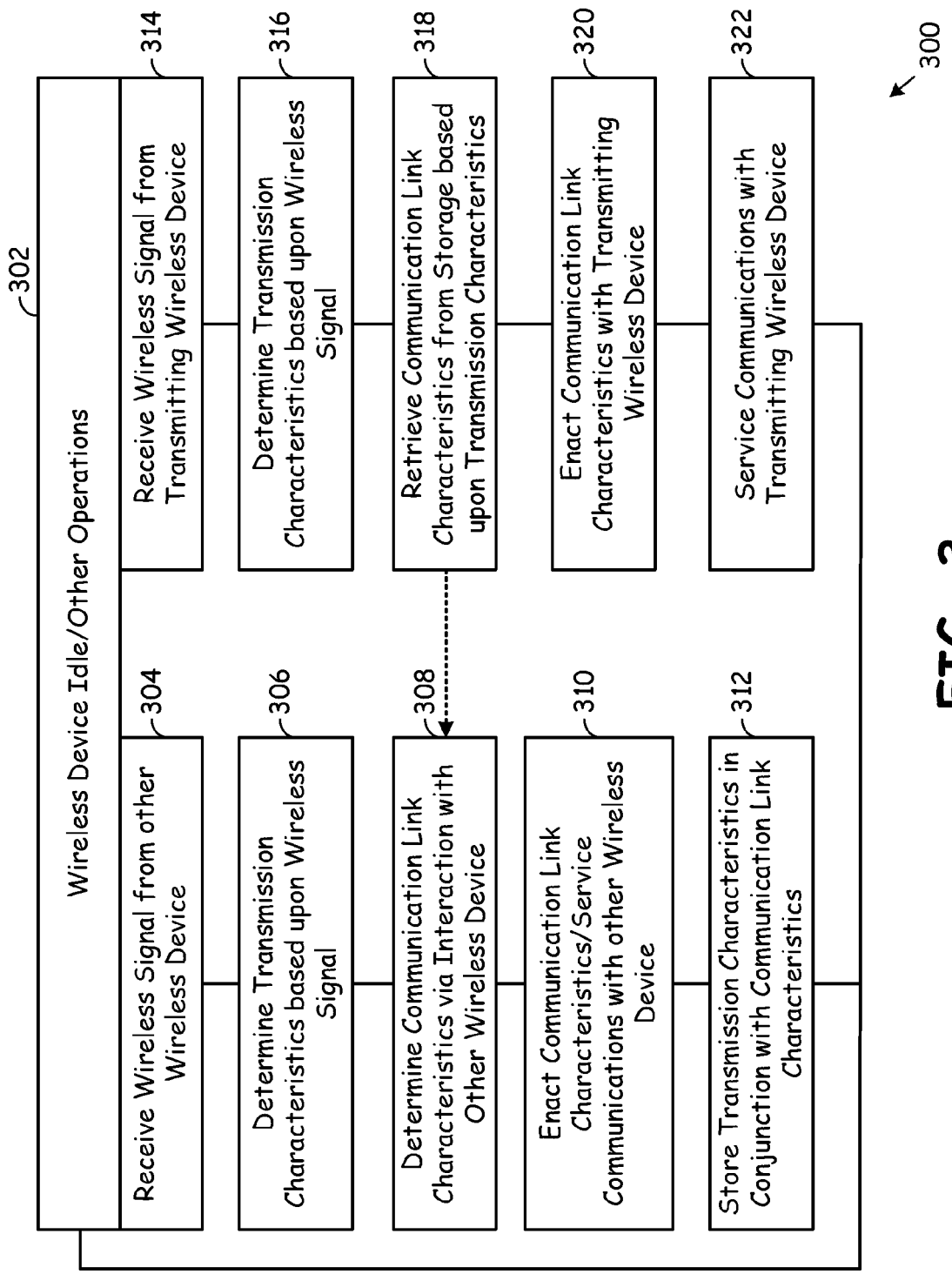
FIG. 3 is a flow chart illustrating operations of a wireless device according to one or more embodiments of the present invention.

FIG. 3 is a flow chart illustrating operations of a wireless device according to one or more embodiments of the present invention. Operation 300 of the wireless device commences with idle/other operations (Step 302) that are performed in addition to the other operations of the present invention. According to the embodiment of FIG. 3, the operations 300 of the wireless device are segregated into first operational period operations and second operational period operations. Generally, the first operational period differs from the second operational period. However, the first operational period and the second operational period may be interspersed over time with one another.

Generally, during a first operational period, the wireless device receives a wireless signal from another wireless device of a plurality of other wireless devices (Step 304). The wireless signal received from the other wireless device may include a header (of a control packet or data packet, for example) that has contained therein a plurality of preamble symbols. According to one embodiment of the operation 300 of FIG. 3, the wireless device uses the preamble symbols to determine transmission characteristics for the other wireless device (Step 306). According to this embodiment, the transmission characteristics determined at Step 306 may be a clock offset between the wireless device and the other wireless device, a phase shift between copies of the wireless signal received via differing antennas of the wireless device, a received signal strength of the wireless signal, in-phase/ quadrature imbalance of the wireless signal, and/or carrier leakage of the wireless signal. Of course, transmission characteristics that are determined based upon the wireless signal received from the other wireless device may include other characteristics as well.

After the wireless device has determined the transmission characteristics of the other wireless device at Step 306, the wireless device determines communication link characteristics of the other wireless device (Step 308). In determining the communication link characteristics of the other wireless device, the wireless device interacts with the other wireless device over an established wireless link. Such interaction may include sending control packets between the wireless device and the other wireless device. Communication link characteristics determined at Step 308 may include receiver gain settings that the wireless device uses to service communications with the other wireless device, coding settings used by the wireless device to communicate with the other wireless device, a communication protocol standard that is supported by the wireless device in communicating with the other wireless device, or other communication link characteristics that will be described further herein or that would fall within the scope of the present invention.

After the wireless device determines the communication link characteristics of the other wireless device via interaction with the other wireless device, the wireless device enacts the communication link characteristics and services communications with the other wireless device (Step 310). Finally, the wireless device stores the transmission characteristics determined at Step 306 in conjunction with the communication link characteristics determined at Step 308 for the other wireless device (Step 312). From Step 312, operation returns to Step 302. The reader should appreciate that the first operational period corresponds to a particular one of the other wireless devices. Differing first operational periods may occur for each of the other wireless devices when determining transmission characteristics and corresponding communication link characteristics for the other wireless device.

During a second operational period that differs from the first operational period, the wireless device receives a wireless signal from a transmitting wireless device (Step 314). However, upon receipt of the wireless signal from the transmitting wireless device at Step 314, the wireless device does not know the identity of the transmitting device initially or communication link characteristics to employ in communicating with the transmitting wireless device. Thus, according to an embodiment of the present invention, the wireless device first determines transmission characteristics of the transmitting wireless device based upon the wireless signal received from the transmitting wireless device (Step 316). The manner in which the wireless device determines the transmission characteristics at Step 316 is same/similar to the manner in which the transmission characteristics were determined at step 306. Then, instead of performing additional operations to determine communication link characteristics for the transmitting wireless device, the wireless device retrieves communication link characteristics from storage based upon the transmission characteristics determined at Step 316. Thus, at Step 318, the wireless device presumptively determines that the transmission characteristics correspond to a particular wireless device previously communicated with during the first operational period and enacts communication link characteristics with the transmitting wireless device (Step 320). Then, the wireless device services the communications with the transmitting wireless device (Step 322).

According to the operations 314-322 of the second operational period, the wireless device saves processing time and communication time by not re-determining communication link characteristics for the transmitting wireless device via communication link investigation. Instead, the wireless device simply retrieves information from memory to indicate the communication link characteristics of the transmitting wireless device. Of course, if the wireless device does not find a match for the transmission characteristics at Step 318, the wireless device would presume that the communication occurred during a first operational period. Thus, a failed operation at Step 318 causes operations to move to Step 308 instead of to Step 320. The reader should understand that the description with reference to FIG. 3 may be altered during such operational duration.

Figure 4:
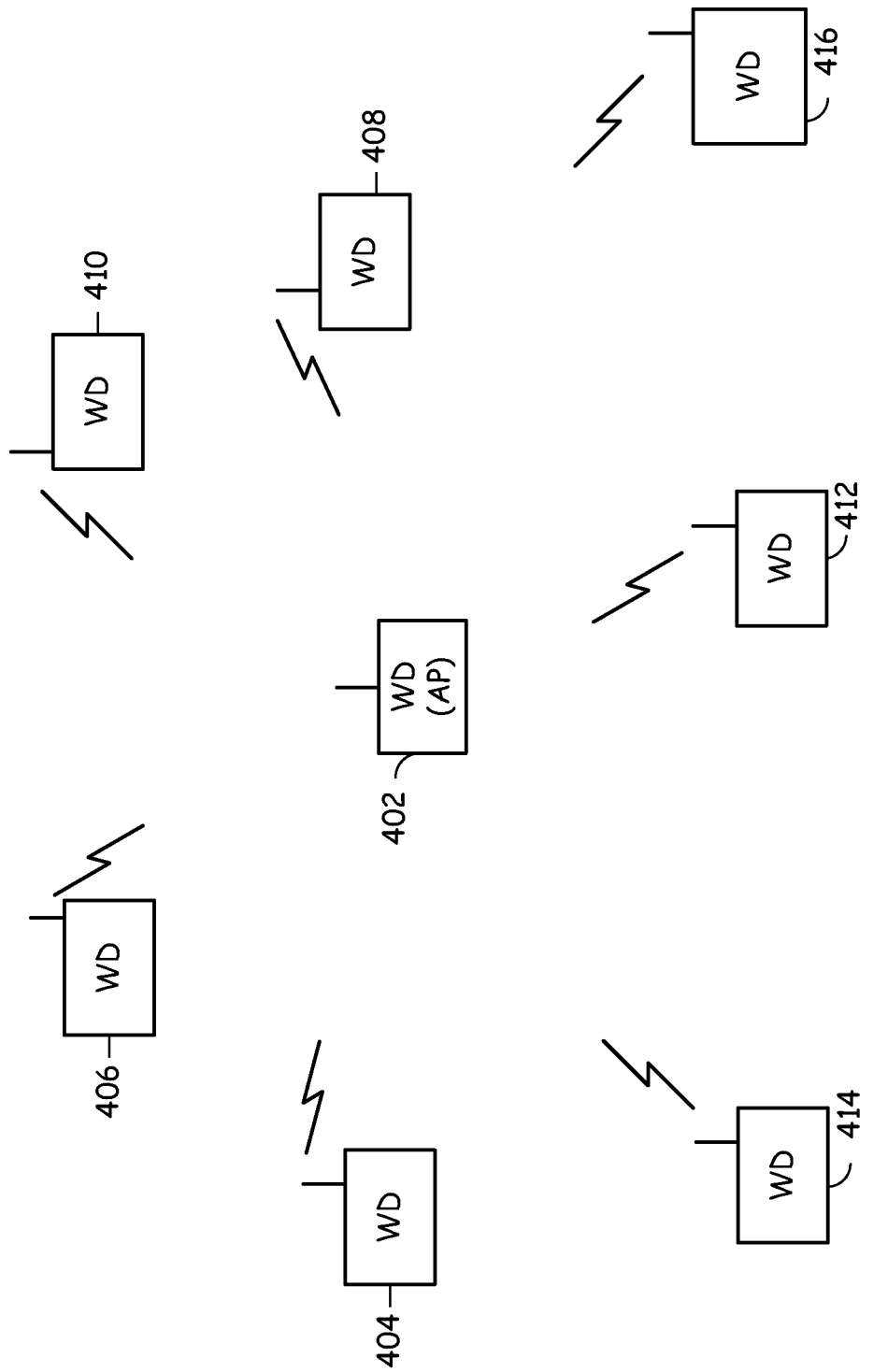
FIG. 4 is a service area topological view illustrating operations of a wireless device according to embodiments of the present invention.

FIG. 4 is a service area topological view illustrating operations of a wireless device according to embodiments of the present invention. The examples used with reference to FIG. 4 consider that the wireless device is an AP 402 within system 400 while the other wireless devices/transmitting wireless devices are wireless terminals 404-414 or other AP. During any of a plurality of first operational periods, the AP 402 receives at least one preamble from one of the other wireless devices 404-416. With particular reference to wireless device 404, the wireless device 404 transmits a wireless signal (that may include a header having a preamble) to AP 402. AP 402 determines transmission characteristics of the other wireless device 404 based upon the wireless signal. Then, based upon the exchange of communications between AP 402 and other wireless device 404, the AP 402 determines communication link characteristic of the other wireless device 404. Then, the AP 402 enacts a communication link with the other wireless device 404 based upon the determined communication link characteristics. The AP 402 then stores the transmission characteristics in conjunction with the communication link characteristics of the other wireless device 404. The AP 402 may repeat these operations with each of the other wireless devices 404-416. Then, the AP 402 has stored thereon transmission characteristics of each of the other wireless devices 404-416 and corresponding communication link characteristics. In essence, the wireless device AP 402 has fingerprinted each of the other wireless devices 404-416 using transmission characteristics of the other wireless devices 404-416. This fingerprinting has been performed based upon investigations of preambles received from each of these other wireless devices 404-416.

Then, during one or more second operational periods, the AP 402 identifies a transmitting wireless device, one of wireless devices 404-416, based upon its transmission characteristics (based upon a received wireless signal). In essence, the AP 402 identifies the transmitting wireless device as a particular one of wireless devices 404-416 based upon the transmission characteristics of the at least one preamble. Then, instead of performing the time consuming operations of interacting with the other wireless device to determine communication link characteristics of the wireless device, the AP 402 simply retrieves the previously stored communication link characteristics. Once the previously stored communication link characteristics have been retrieved that correspond to a transmitting one of the other wireless devices, e.g., wireless device 404, the AP 402 can simply enact the retrieved communication link characteristics and service communications with the transmitting wireless device 404 using the retrieved communication link characteristics.

Figure 5:
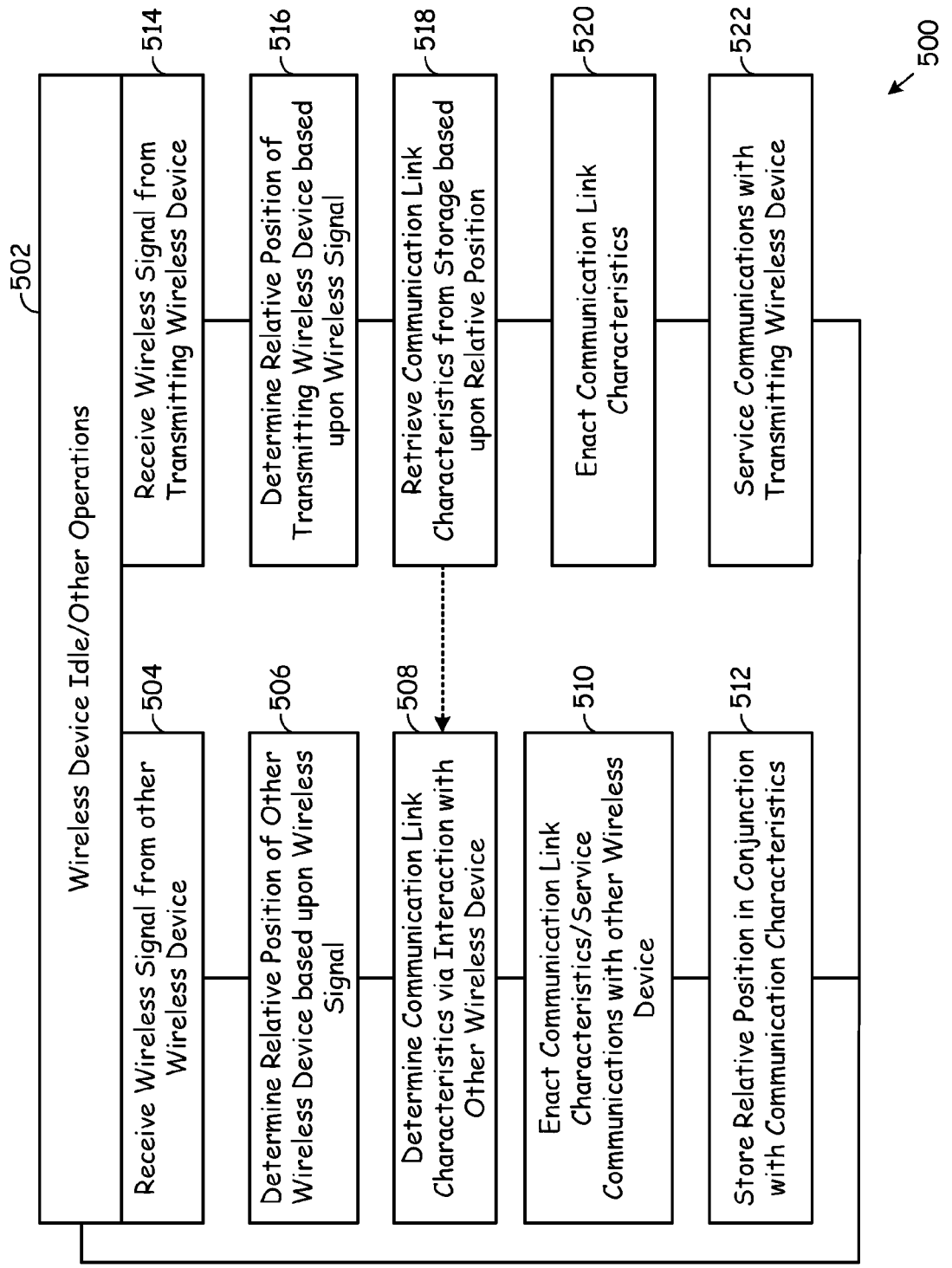
FIG. 5 is a flow chart illustrating operations of a wireless device according to one or more other embodiments of the present invention.

FIG. 5 is a flow chart illustrating operations of a wireless device according to one or more other embodiments of the present invention. The wireless device operates in an idle mode or performs other operations (Step 502) in addition to performing operations according to the present invention. When the wireless device initiates operation during a first operational period, for each of a plurality of other wireless devices, the wireless device performs Steps 504-512. In a first operation during the first operational period, the wireless device receives a wireless signal from the other wireless device of the plurality of other wireless devices (Step 504). Then, the wireless device determines a relative position of the other wireless device based upon the received wireless signal (Step 506). The operations of Step 506 include controlling a directional antenna having antennas 248A and 248B, for example, under control of the radio 204 (as described with reference to FIG. 2). Generally, in determining the relative position of the other wireless device at Step 506, the wireless device controls a gain pattern of the directional antenna until identifying a maximum (or semi-maximum) received signal strength for the transmissions from the other wireless device. In doing so, the wireless device determines a relative angular position of the other wireless device. Then, based upon additional interaction with the other wireless device, the wireless device determines communication link characteristics to be employed with the other wireless device (Step 508). Then, the wireless device enacts the communication link characteristics and services communications with the other wireless device using the communication link characteristics (Step 510). As was previously described, communication link characteristics may include communication protocol standards that support communications between the wireless device and the other wireless device, receiver gain settings of the wireless device when communicating with the other wireless device, coding settings used by the wireless device to service communications with the other wireless device, and/or other communication link characteristics. Then, to conclude the operations during the first operational period, the wireless device stores the relative positions of the other wireless device in conjunction with communication characteristics (Step 512). At Step 512, operation returns to Step 502. These operations 504-512 will be described further with reference to the system illustrated in FIG. 6.

During a second operational period that differs from the first operational period, Steps 514-524 are employed by the wireless device for a transmitting wireless device of the plurality of other wireless devices. Operation during the second operational period commences with receiving a wireless signal from a transmitting wireless device (Step 514). Operation then continues with determining a relative position of the transmitting wireless device based upon the received wireless signal (Step 516). Then, the wireless device retrieves communication link characteristics from storage based upon the relative position determined at Step 516 (Step 518). If the wireless device is unable to correlate the determined relative position at Step 516 with a relative position previously stored in memory, operation proceeds to Step 508 where communication link characteristics for the transmitting wireless device are determined based upon additional interaction with the transmitting wireless device.

Alternatively, upon retrieval of communication link characteristics based upon the relative position determined at Step 516 in the access operation of Step 518, the wireless device enacts the retrieved communication link characteristics for the transmitting wireless device (Step 520). In doing so, the wireless device enacts the retrieved communication link characteristics based upon a presumed identification of a previously identified other wireless device. Then, operations during the second operational period conclude by servicing communications with the transmitting wireless device using the retrieved and enacted communication link characteristics (Step 522). From Step 522 operation returns to Step 502.

Figure 6:
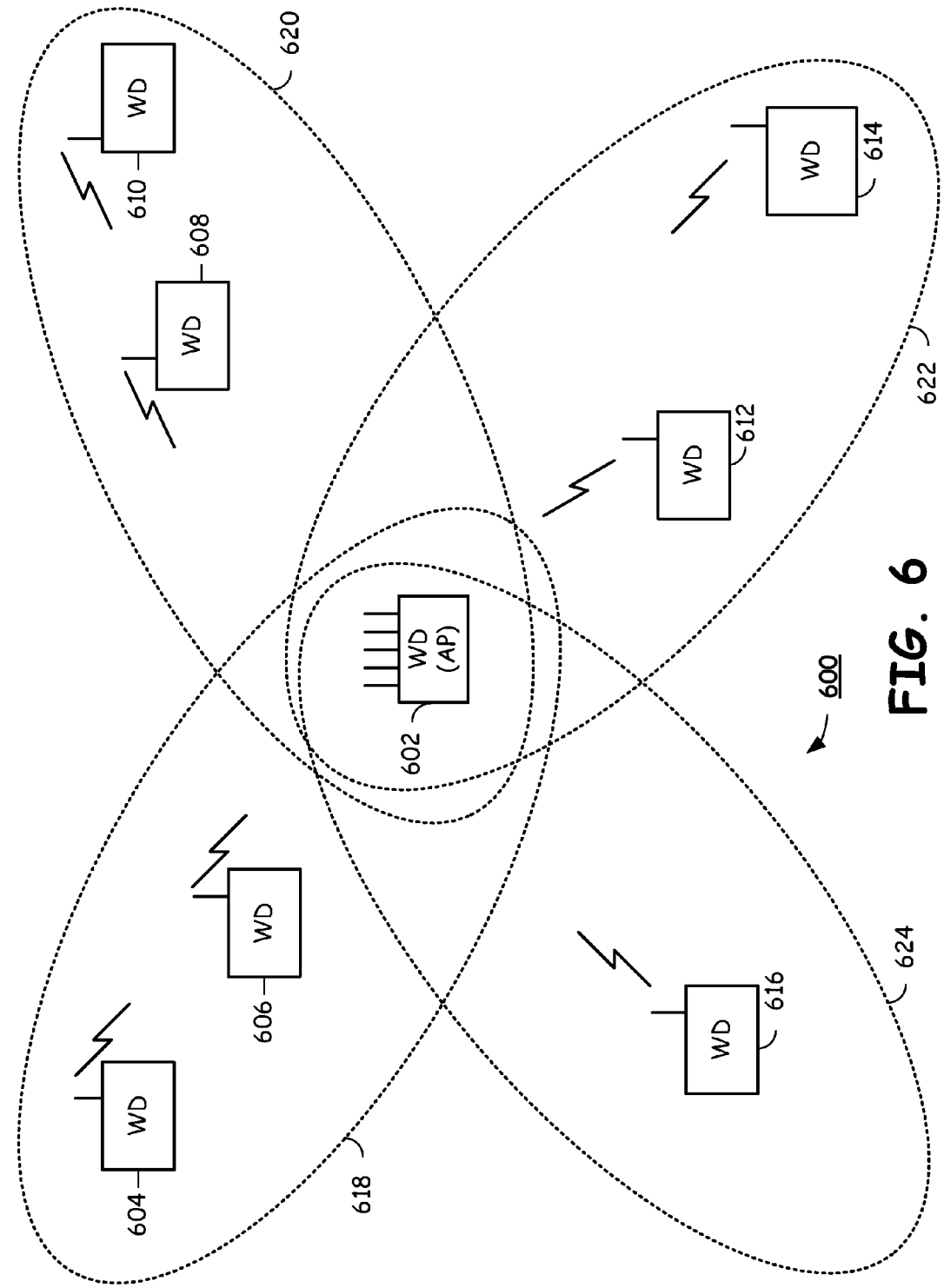
FIG. 6 is a service area topological view illustrating operations of a wireless device according to other embodiments of the present invention.

FIG. 6 is a service area topological view illustrating operations of a wireless device according to other embodiments of the present invention. The system 600 is employed to further describe operations according to the embodiment of the present invention is described with reference to the operations 500 of FIG. 5. With the system 600 of FIG. 6, the wireless device comprises an AP 602 while the other wireless devices 604, 606, 608, 610, 612, 614, and 616 may be wireless terminals or other APs that are in communication with the AP 602. As is further shown in FIG. 6, differing antenna gain patterns 618, 620, 622, and 624 are shown. Each of these antenna gain patterns 618-624 is exaggerated to show how the AP 602 could control an antenna array to direct an antenna gain pattern for differing ones of the plurality of other wireless devices 604-616. A non-directional antenna gain pattern (not shown) would be uniform about the AP 602.

During the first operational period, for some/all of the plurality of other wireless devices 604-616, the AP 602 receives wireless signals from the other wireless devices 604-616. Then, for some/all of the plurality of the other wireless devices, the AP 602 determines relative positions of the other wireless devices. After determining a relative position of a wireless device, the AP 602 determines communication link characteristics for the other wireless device, enacts communication link characteristics for the other device, and stores the determined relative position of the other wireless device in conjunction with the corresponding communication link characteristics.

For example, during a first operational period, AP 602 receives wireless signals from other wireless device 610. Initially, the AP 602 may receive these transmissions using a non-directional antenna gain pattern. AP 602 then controls its antenna array to direct an antenna gain pattern 620 towards wireless device 610 to determine a relative position of the wireless device 610 with respect to AP 602. Via subsequent communications with the other wireless device 610, AP 602 determines communication link characteristics corresponding to the other wireless device 610. Then, the AP 602 stores the relative position of the other wireless device 610 in conjunction with the determined communication link characteristics of the other wireless device 610.

Then, during a second operational period that differs from the first operational period, the AP 602 receives transmissions from a transmitting wireless device 610. Such transmissions may be initially received using a non-directional antenna gain pattern. The AP 602 then determines the relative position of the transmitting wireless device 610 using its directional antenna. Then, instead of performing further communications and processing, the AP 602 simply retrieves the previously stored communication link characteristics based upon the relative position of the transmitting wireless device 610 with respect to AP 602. The AP 602 then enacts the retrieve communication link characteristics and services communications with the transmitting wireless device 610 using the retrieve communication link characteristics.

The operations of the first operational period and second operational period may be performed with any of the other wireless devices 604, 606, 608, 610, 612, 614, and 616. Further, the operations of FIGS. 5 and 6 could be combined to the operation of FIGS. 3 and 4 to effectively fingerprint each of the wireless devices 604-616 based upon not only transmission characteristics but also relative positional characteristics of the wireless devices. Further, the communication link characteristics could include directional antenna settings, such communication link characteristics determined based upon transmission characteristics determined from a preamble.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

We claim:

1. A method comprising:
receiving, at a first wireless device in a network, a first wireless signal from a second wireless device in the network over a communication link during a first operational period;
determining from receiving the first wireless signal at the first wireless device, transmission characteristics of the second wireless device in transmitting the first wireless signal to the first wireless device;
determining, at the first wireless device via interaction with the second wireless device, communication link characteristics for implementation on the communication link to service communications between the first and second wireless devices;
enacting the communication link characteristics for the communication link to service communications between the first and second wireless devices;
associating the transmission characteristics and the communication link characteristics corresponding to the first wireless signal from the second wireless device over the communication link;
storing, in a storage of the first wireless device, the associated transmission characteristics and the communication link characteristics corresponding to the communication link with the second wireless device;
receiving, at the first wireless device, a second wireless signal from the second wireless device during a second operational period following the first operational period;
determining from receiving the second wireless signal at the first wireless device, transmission characteristics of the second wireless device in transmitting the second wireless signal;
searching the storage to identify transmission characteristics stored in the storage that matches the transmission characteristics determined for the second wireless signal;
retrieving from the storage, corresponding communication link characteristics associated with a matching transmission characteristics, when there is a match of the transmission characteristics of the second wireless signal to the transmission characteristics of the first wireless signal in the storage; and
using stored communication link characteristics of the matching transmission characteristics, instead of determining communication link characteristics for the second wireless signal by interacting with the second wireless device, to service communications on the communication link between the first and second wireless devices following reception of the second wireless signal, but when the matching transmission characteristic is not identified in the storage for the second wireless signal, determining the communication link characteristics for the communication link, via interaction with the second wireless device.

2. The method of claim 1, wherein the transmission characteristics of the second wireless device is determined for the first wireless signal by at least one of:
a clock offset between the first wireless device and the second wireless device;
a phase shift between copies of the first wireless signal received via differing antennas of the first wireless device;
received signal strength of the first wireless signal;
in-phase/quadrature imbalance of the first wireless signal; and
carrier leakage of the first wireless signal.

3. The method of claim 1, wherein the communication link characteristics is determined by at least one of:
receiver gain settings of the first wireless device; and
coding settings of the first wireless device.

4. The method of claim 1, wherein the communication link characteristics is determined by a communication protocol standard supporting communications between the first and second wireless devices.

5. The method of claim 1, wherein the first wireless device operates as an access point for the network.

6. An apparatus comprising:
a radio frequency (RF) circuitry to wirelessly transmit and receive RF signals; and
a processor coupled to the RF circuitry to provide processing in which the processor to:

receive a first signal from a wireless device in a network over a communication link during a first operational period, in which the network also includes the apparatus;

determine from receiving the first signal, transmission characteristics of the wireless device in transmitting the first signal to the apparatus;

determine, via interaction with the wireless device, communication link characteristics for implementation on the communication link to service communications between the apparatus and the wireless device;

enact the communication link characteristics for the communication link to service communications between the apparatus and the wireless device;

associate the transmission characteristics and the communication link characteristics corresponding to the first signal from the wireless device over the communication link;

store in a storage, the associated transmission characteristics and the communication link characteristics corresponding to the communication link with the wireless device;

receive a second signal from the wireless device during a second operational period following the first operational period;

determine from receiving the second signal, transmission characteristics of the wireless device in transmitting the second signal;

search the storage to identify transmission characteristics stored in the storage that matches the transmission characteristics determined for the second signal;

retrieve from the storage, corresponding communication link characteristics associated with a matching transmission characteristics, when there is a match of the transmission characteristics of the second signal to the transmission characteristics of the first signal in the storage; and use stored communication link characteristics of the matching transmission characteristics, instead of determining communication link characteristics for the second signal by interacting with the wireless device, to service communications on the communication link between the apparatus and the wireless device following reception of the second signal, but when the matching transmission characteristic is not identified in the storage for the second signal, determine the communication link characteristics for the communication link, via interaction with the wireless device.

7. The apparatus of claim 6, wherein the processor to determine the transmission characteristics of the wireless device for the first signal by determining at least one of:
a clock offset between the apparatus and the wireless device;
a phase shift between copies of the first signal received via differing antennas of the apparatus;
received signal strength of the first signal;
in-phase/quadrature imbalance of the first signal; and
carrier leakage of the first signal.

8. The apparatus of claim 6, wherein the processor to determine the communication link characteristics by determining at least one of:
receiver gain settings of the apparatus; and
coding settings of the apparatus.

9. The apparatus of claim 6, wherein the processor to determine the communication link characteristics by determining a communication protocol standard supporting communications between the apparatus and the wireless device.

10. The apparatus of claim 6, wherein the apparatus to operate as an access point for the network.

11. A method comprising:
receiving, at a first wireless device in a network, a first wireless signal from a second wireless device in the network over a communication link during a first operational period;

determining from receiving the first wireless signal at the first wireless device using a directional antenna, relative position of the first wireless device to the second wireless device from other wireless devices in the network;

determining, at the first wireless device via interaction with the second wireless device, communication link characteristics for implementation on the communication link to service communications between the first and second wireless devices;

enacting the communication link characteristics for the communication link to service communications between the first and second wireless devices;

associating the relative position and the communication link characteristics corresponding to the first wireless signal from the second wireless device over the communication link;

storing, in a storage of the first wireless device, the associated relative position and the communication link characteristics corresponding to the communication link with the second wireless device;

receiving, at the first wireless device, a second wireless signal from the second wireless device during a second operational period following the first operational period;

determining from receiving the second wireless signal at the first wireless device using the directional antenna, relative position of the first wireless device to the second wireless device from the other wireless devices in the network;

searching the storage to identify relative positions stored in the storage that matches the relative position determined for the second wireless signal;

retrieving from the storage, corresponding communication link characteristics associated with a matching relative position, when there is a match of the relative position of the second wireless signal to the relative position of the first wireless signal in the storage; and using stored communication link characteristics of the matching relative position, instead of determining communication link characteristics for the second wireless device by interacting with the second wireless device, to service communications on the communication link between the first and second wireless devices following reception of the second wireless signal, but when the matching relative position is not identified in the storage for the second wireless signal, determining the communication link characteristics for the communication link, via interaction with the second wireless device.

12. The method of claim 11, wherein determining the relative position of the second wireless device includes determining a relative angular position between the first and second wireless devices.

13. The method of claim 11, wherein determining the relative position of the second wireless device includes controlling directional antennas.

14. The method of claim 13, wherein determining the relative position of the second wireless device includes controlling a gain pattern of the directional antennas.

15. The method of claim 13, wherein determining the relative position of the second wireless includes determining a relative angular position between the first and second wireless devices using the directional antennas.

16. An apparatus comprising:
a radio frequency (RF) circuitry to wirelessly transmit and receive RF signals; and
a processor coupled to the RF circuitry to provide processing in which the processor to:
  receive a first signal from a wireless device in a network over a communication link during a first operational period, in which the network also includes the apparatus;
  determine from receiving the first signal using a directional antenna, relative position of the apparatus to the wireless device from other wireless devices in the network;
  determine, via interaction with the wireless device, communication link characteristics for implementation on the communication link to service communications between the apparatus and the wireless device;
  enact the communication link characteristics for the communication link to service communications between the apparatus and the wireless device;
  associate the relative position and the communication link characteristics corresponding to the first signal from the wireless device over the communication link;
  store, in a storage, the associated relative position and the communication link characteristics corresponding to the communication link with the wireless device;
  receive a second signal from the wireless device during a second operational period following the first operational period;
  determine from receiving the second signal using the directional antenna, relative position of the apparatus to the wireless device from the other wireless devices in the network;
  search the storage to identify relative positions stored in the storage that matches the relative position determined for the second signal;
  retrieve from the storage, corresponding communication link characteristics associated with a matching relative position, when there is a match of the relative position of the second signal to the relative position of the first wireless signal in the storage; and
  use stored communication link characteristics of the matching relative position, instead of determining communication link characteristics for the second signal by interacting with the wireless device, to service communications on the communication link between the apparatus and the wireless device following reception of the second signal, but when the matching relative position is not identified in the storage for the second signal, determine the communication link characteristics for the communication link, via interaction with the wireless device.

17. The apparatus of claim 16, further including the processor to determine the relative position of the wireless device by determining a relative angular position between the apparatus and the wireless device.

18. The apparatus of claim 16, further including the processor to determine the relative position of the wireless device by controlling directional antennas.

19. The apparatus of claim 18, further including the processor to determine the relative position of the wireless device by controlling a gain pattern of the directional antennas.

20. The apparatus of claim 18, further including the processor to determine the relative position of the wireless device by determining a relative angular position between the apparatus and the wireless device using the directional antennas.

* * * * *

UNITED STATES PATENT AND TRADEMARK OFFICE
CERTIFICATE OF CORRECTION

PATENT NO. : 8,639,261 B2  
APPLICATION NO. : 13/563572  
DATED : January 28, 2014  
INVENTOR(S) : Mark Gonikberg et al.

Page 1 of 1

It is certified that error appears in the above-identified patent and that said Letters Patent is hereby corrected as shown below:

In the Claims

Col. 15, line 2, in claim 15: after "position of the second wireless" insert --device--

Signed and Sealed this
Thirtieth Day of September, 2014

Michelle K. Lee
*Deputy Director of the United States Patent and Trademark Office*